United States Patent
Uno et al.

(10) Patent No.: US 11,618,397 B2
(45) Date of Patent: Apr. 4, 2023

(54) VEHICLE-POWER-GENERATOR CONTROL APPARATUS

(71) Applicant: Mitsubishi Electric Corporation, Tokyo (JP)

(72) Inventors: Norifumi Uno, Tokyo (JP); Hideyuki Imanaka, Tokyo (JP); Junya Sasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 189 days.

(21) Appl. No.: 17/081,265

(22) Filed: Oct. 27, 2020

(65) Prior Publication Data
US 2021/0284087 A1  Sep. 16, 2021

(30) Foreign Application Priority Data
Mar. 13, 2020 (JP) .............................. JP2020-043866

(51) Int. Cl.
*B60R 16/03* (2006.01)
*F02B 63/04* (2006.01)
*H02K 7/00* (2006.01)

(52) U.S. Cl.
CPC ............ *B60R 16/03* (2013.01); *F02B 63/042* (2013.01); *H02K 7/006* (2013.01)

(58) Field of Classification Search
CPC ........ B60R 16/03; F02B 63/042; H02K 7/006
See application file for complete search history.

(56) References Cited

U.S. PATENT DOCUMENTS

| 5,726,559 A | 3/1998 | Taniguchi et al. |
| 6,215,284 B1 | 4/2001 | Komurasaki et al. |
| 8,838,367 B1 * | 9/2014 | McAlister ............... F02D 41/04 |
| | | 701/110 |
| 10,442,427 B2 * | 10/2019 | Petrucci ................ B60W 10/18 |

(Continued)

FOREIGN PATENT DOCUMENTS

| DE | 10 2019 108 082 A1 | 10/2019 |
| JP | 6-197473 A | 7/1994 |

(Continued)

OTHER PUBLICATIONS

Office Action dated May 18, 2021 issued by the Japanese Patent Office in Japanese Application No. 2020-043866, English Translation.

(Continued)

*Primary Examiner* — Long T Tran
(74) *Attorney, Agent, or Firm* — Sughrue Mion, PLLC; Richard C. Turner (57) ABSTRACT

There is provided a vehicle-power-generator control apparatus that can largely raise the gasoline mileage of an internal combustion engine. The vehicle-power-generator control apparatus includes a boost control unit having a function of making a magnetic-field current control unit perform boost-on control or boost-off control, based on a command provided by an ECU through communication and a function of making the magnetic-field current control unit perform boost-on control or boost-off control, based on at least one of a rotation speed of an internal combustion engine and a temperature of a vehicle power generator.

4 Claims, 7 Drawing Sheets

(56) References Cited

U.S. PATENT DOCUMENTS

| | | | |
|---|---|---|---|
| 2009/0167234 A1* | 7/2009 | Uechi | H02M 1/32 |
| | | | 180/65.285 |
| 2009/0306841 A1* | 12/2009 | Miwa | B60L 53/24 |
| | | | 701/31.4 |
| 2011/0109278 A1 | 5/2011 | Kikuchi et al. | |
| 2011/0193506 A1* | 8/2011 | Hayashi | H02P 6/28 |
| | | | 318/400.12 |
| 2012/0091958 A1* | 4/2012 | Ichikawa | B60L 3/0046 |
| | | | 320/109 |
| 2013/0033237 A1 | 2/2013 | Kim et al. | |
| 2016/0129796 A1* | 5/2016 | Tomura | B60W 20/00 |
| | | | 903/906 |
| 2016/0142000 A1* | 5/2016 | Oba | B60L 50/13 |
| | | | 318/400.04 |
| 2016/0339997 A1* | 11/2016 | Crain | B60L 50/30 |
| 2018/0086419 A1* | 3/2018 | Crain | B60W 10/06 |
| 2019/0214921 A1* | 7/2019 | Crain | H02P 29/68 |
| 2020/0309079 A1* | 10/2020 | Watanabe | B60W 20/40 |
| 2020/0398815 A1* | 12/2020 | Uno | B60W 10/08 |

FOREIGN PATENT DOCUMENTS

| | | |
|---|---|---|
| JP | 6-233466 A | 8/1994 |
| JP | 7-59269 A | 3/1995 |
| JP | 9-19194 A | 1/1997 |
| JP | 2011-200062 A | 10/2011 |
| JP | 2014-187767 A | 10/2014 |
| JP | 2016-193631 A | 11/2016 |
| JP | 2019-176695 A | 10/2019 |
| WO | 99/53596 A1 | 10/1999 |

OTHER PUBLICATIONS

Office Action dated Nov. 14, 2022 from the French Patent Office in FR Application No. 2102110.

\* cited by examiner

VEHICLE-POWER-GENERATOR CONTROL APPARATUS

BACKGROUND OF THE INVENTION

Field of the Invention

The present disclosure relates to a vehicle-power-generator control apparatus.

Description of the Related Art

As is well known, in order to raise gasoline mileage of a vehicle, the idle rotation speed of an internal combustion engine tends to be reduced; in order to reduce the load on an internal combustion engine at a time of idle driving, there is performed magnetic-field current suppression control in which a magnetic-field current for a vehicle power generator to be driven by the internal combustion engine is suppressed so that the generation voltage of the vehicle power generator is suppressed. When while the magnetic-field current suppression control is performed, an increase in the electric load or the like lowers the generation voltage, the magnetic-field current suppression control is prohibited and then control for increasing the generation voltage of the vehicle power generator is performed. However, there exists a probability that such control of magnetic-field current causes a large torque fluctuation to occur in the vehicle power generator and hence the rotation speed of the internal combustion engine largely fluctuates while idle driving is performed.

Accordingly, for example, a conventional vehicle-power-generator control apparatus disclosed in Patent Document 1 is provided with a magnetic-field current suppression control prohibition/cancellation circuit, in order to stabilize the rotation speed of an internal combustion engine. When the generation voltage of the vehicle power generator becomes the same as or lower than a second setting voltage, which is lower than a first setting voltage, the magnetic-field current suppression control prohibition/cancellation circuit prohibits magnetic-field current suppression control so as to increase the generation voltage. When due to the prohibition of the magnetic-field current suppression control, the generation voltage increases to reach a third setting voltage, which is the same as or higher than the second setting voltage but lower than the first setting voltage, the magnetic-field current suppression control prohibition/cancellation circuit cancels the prohibition of the magnetic-field current suppression control so as to decrease the generation voltage of the vehicle power generator.

Because the conventional vehicle-power-generator control apparatus disclosed in Patent Document 1 is provided with a voltage hysteresis in which a setting voltage that is a reference for prohibition of magnetic-field current suppression control and a setting voltage that is a reference for cancellation of the magnetic-field current suppression control are different from each other, the rotation speed of an internal combustion engine is prevented from fluctuating largely; moreover, because after the magnetic-field current suppression control has been once prohibited, a certain length of time is secured until the prohibition is cancelled, the power-source voltage can be recovered.

PRIOR ART REFERENCE

Patent Literature

[Patent Document 1] Japanese Patent Application Laid-Open No. 2011-200062

SUMMARY OF THE INVENTION

The conventional vehicle-power-generator control apparatus disclosed in Patent Document 1 is configured in such a way as to perform switching between prohibition of the magnetic-field current suppression control and cancellation of the magnetic-field current suppression control, based on its own determination, as described above; however, the conventional vehicle-power-generator control apparatus is not configured in such a way that through communication with an external ECU (Electronic Control Unit), the ECU can directly perform the switching between prohibition of the magnetic-field current suppression control and cancellation of the magnetic-field current suppression control. Therefore, because the switching between prohibition of the magnetic-field current suppression control and cancellation of the magnetic-field current suppression control cannot be performed in real time, there has been a problem that the gasoline mileage of the internal combustion engine cannot sufficiently be raised.

The present disclosure has been implemented in order to solve the foregoing problem; the objective thereof is to provide a vehicle-power-generator control apparatus that can largely raise the gasoline mileage of an internal combustion engine.

A vehicle-power-generator control apparatus disclosed in the present disclosure can perform boost-off control for making a vehicle power generator generate electric power while a magnetic-field current is suppressed and boost-on control for making the vehicle power generator generate electric power while suppression of a magnetic-field current is prohibited. The vehicle-power-generator control apparatus includes a communicator that communicates with an external ECU, a magnetic-field current controller that controls a magnetic-field current in the vehicle power generator, a boost controller that makes the magnetic-field current controller perform the boost-on control and the boost-off control, a rotation speed detector that detects a rotation speed of an internal combustion engine for driving the vehicle power generator, and a temperature sensor that detects a temperature of the vehicle power generator. The vehicle-power-generator control apparatus is characterized in that the boost controller has a function of making the magnetic-field current controller perform the boost-on control or the boost-off control, based on a command provided by the ECU through communication performed by the communicator, and a function of making the magnetic-field current controller perform the boost-on control or the boost-off control, based on at least one of a rotation speed of the internal combustion engine, detected by the rotation speed detector, and a temperature of the vehicle power generator, detected by the temperature sensor.

The present disclosure makes it possible to obtain a vehicle-power-generator control apparatus that can largely raise the gasoline mileage of an internal combustion engine.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
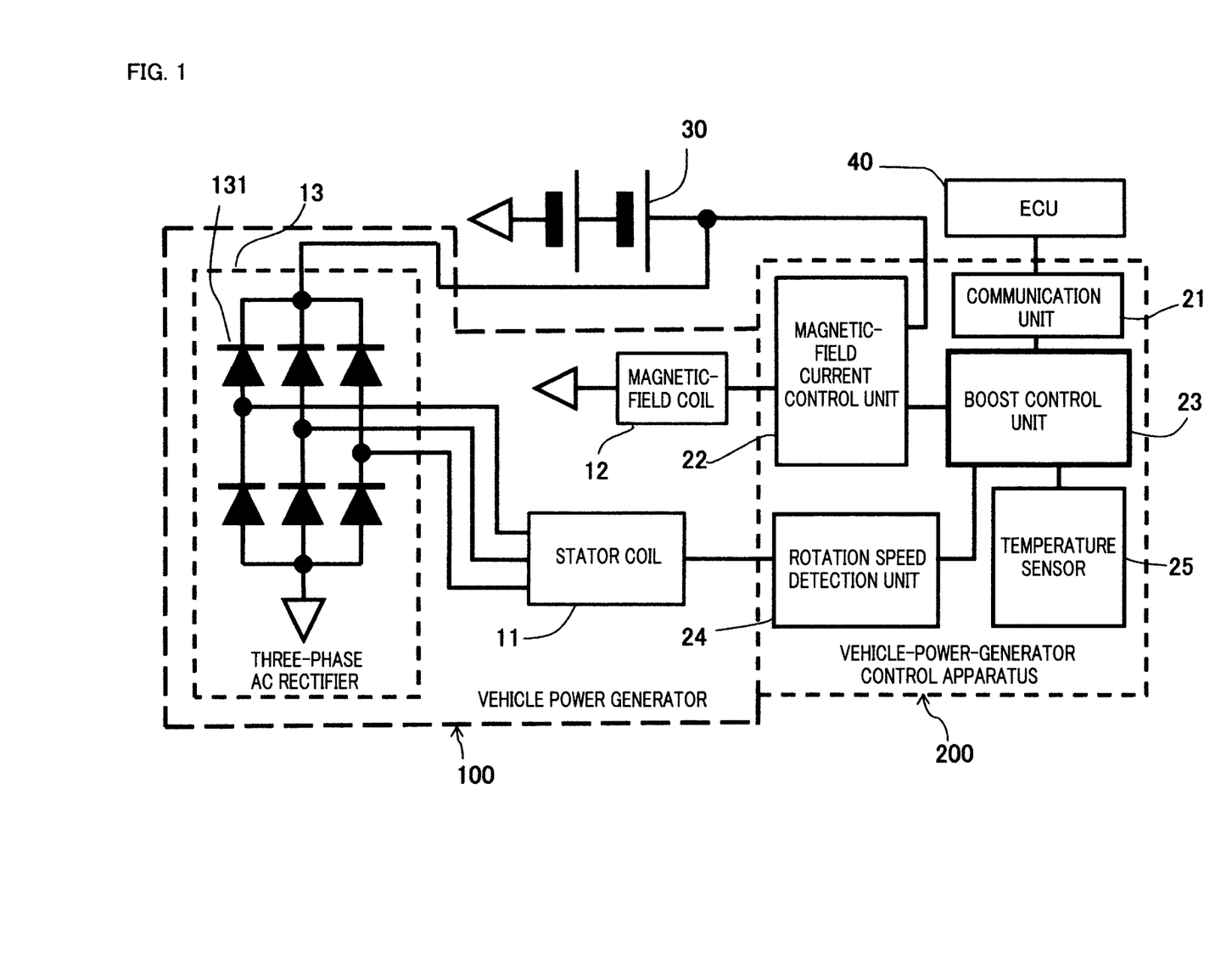
FIG. 1 is a block diagram representing the respective configurations of a vehicle-power-generator control apparatus and a vehicle power generator according to Embodiment 1.

Hereinafter, a vehicle-power-generator control apparatus according to Embodiment 1 will be explained with reference to the drawings. FIG. 1 is a block diagram representing the respective configurations of a vehicle-power-generator control apparatus and a vehicle power generator according to Embodiment 1. In FIG. 1, a vehicle power generator 100 mounted in a vehicle has a magnetic-field coil 12 mounted in a rotor coupled with the output axle of an internal combustion engine (unillustrated) through a belt (unillustrated), a three-phase Y-connected stator coil 11 mounted in a stator, and a three-phase AC rectifier 13 formed of six semiconductor rectifier elements 131.

In the vehicle power generator 100, the output axel of the internal combustion engine drives the rotor through the belt so as to rotate the rotor, and magnetic flux generated by the magnetic-field coil 12 mounted in the rotor is interlinked with the three-phase Y-connected stator coil 11; as a result, a three-phase AC voltage is generated in the stator coil 11. The three-phase AC voltage generated in the stator coil 11 is converted into a DC voltage by the three-phase AC rectifier 13 and is supplied to a battery 30 mounted in the vehicle and vehicle electric apparatuses (unillustrated).

The vehicle-power-generator control apparatus 200 is fixed to the housing of the vehicle power generator 100 and is configured in such a way that the output voltage of the vehicle power generator 100 is controlled by controlling a magnetic-field current flowing in the magnetic-field coil 12 of the vehicle power generator 100, based on a command from an ECU 40 provided in an external control apparatus; the vehicle-power-generator control apparatus 200 has a function of mainly performing control so that each of the output voltage and the output current of the vehicle power generator 100 becomes a substantially constant value.

The vehicle-power-generator control apparatus 200 is provided with a communication unit 21 as a communicator having a reception unit and a transmission unit. Interactive communication, for example, through a LIN (Local Interconnect Network) is performed between the communication unit 21 and the ECU 40. The vehicle-power-generator control apparatus 200 is further provided with a magnetic-field current control unit 22 as a magnetic-field current controller. The magnetic-field current control unit 22 is provided, for example, with a power transistor, such as a MOS-FET (Metal Oxide Semiconductor-Field Effect Transistor), for performing on/off-control of a magnetic-field current for the magnetic-field coil 12 and a recirculation diode for making a magnetic-field current flowing in the magnetic-field coil 12 recirculate when the power transistor is turned off.

Moreover, the vehicle-power-generator control apparatus 200 is provided with a boost control unit 23 as a boost controller. The boost control unit 23 is configured in such a way as to make the magnetic-field current control unit 22 perform boost-on control and boost-off control of the vehicle power generator 100. The boost control unit 23 is configured, for example, with a software program. Here, the boost-on control means the control that can prohibit magnetic-field current suppression control so as to increase the generation voltage. The boost-off control means the control that can perform magnetic-field current suppression control so as to decrease the generation voltage.

As is well known, a vehicle power generator is an apparatus that utilizes output torque of an internal combustion engine so as to generate electric power for a target voltage and that is configured in such a way as to generate electric power while the power-generation amount thereof is restricted by an external apparatus such as an ECU for controlling the internal combustion engine. As described above, in recent years, in order to raise gasoline mileage of a vehicle, the idle rotation speed of an internal combustion engine has been reduced; in order to reduce the load on the internal combustion engine at a time of idle driving, the boost-off control, i.e., the magnetic-field current suppression control is performed; when while the magnetic-field current suppression control is performed, an increase in the electric load or the like lowers the generation voltage, the boost-on control, i.e., the magnetic-field current suppression control is prohibited.

From the stator coil 11, a rotation speed detection unit 24 as a rotation speed detector receives a rotation pulse based on rotation of the rotor of the vehicle power generator 100, detects the rotation speed of the rotor, i.e., the rotation speed of the internal combustion engine, and then inputs the rotation speed to the boost control unit 23. A temperature sensor 25 detects the temperature of the vehicle power generator 100 and then inputs the temperature to the boost control unit 23. The rotation speed of the internal combustion engine is one and the same as that of the vehicle power generator 100; when the rotation speed of the internal combustion engine is low, the power generation capacity of the vehicle power generator 100 decreases. In addition, when the temperature of the vehicle power generator 100 is high, the power generation capacity of the vehicle power generator 100 decreases.

As described later, the boost control unit 23 is configured as follows: when for some reason, communication between the ECU 40 and the vehicle-power-generator control apparatus 200 is cut off, the boost control unit 23 can itself determine whether the magnetic-field current control unit 22 should perform the boost-on control or the boost-off control, based on at least one of the rotation speed of the internal combustion engine from the rotation speed detection unit 24 and the temperature of the vehicle power generator 100 from the temperature sensor 25.

In the vehicle-power-generator control apparatus, configured in such a manner as described above, according to Embodiment 1, the communication unit 21 receives a control signal such as a command and then inputs the control signal to the boost control unit 23. The rotation speed detection unit 24 inputs the detected rotation speed of the internal combustion engine to the boost control unit 23. The temperature sensor 25 inputs the obtained temperature information on the vehicle power generator 100 to the boost control unit 23.

When LIN communication is established between the ECU 40 and the vehicle-power-generator control apparatus 200, the communication unit 21 receives a command for boost-on or boost-off and a command for magnetic-field-current-on or magnetic-field-current-off from the ECU 40, through an ECU-signal input terminal in the reception unit of the communication unit 21. In this situation, the command for boost-on or boost-off, as an independent command, is allocated to a LIN frame and then is transmitted.

Figure 4:
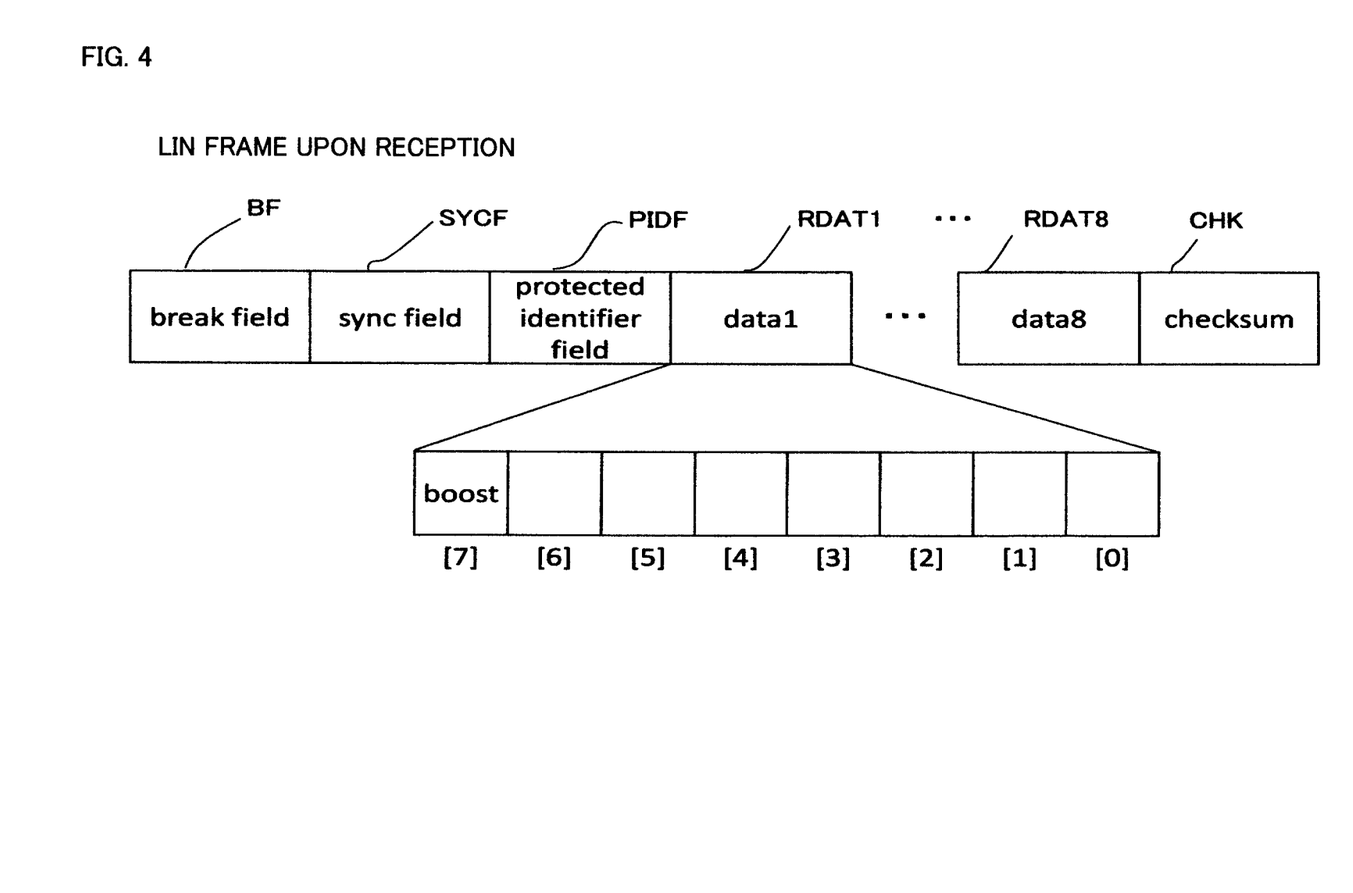
FIG. 4 is an explanatory chart representing a LIN-frame format upon reception in the vehicle-power-generator control apparatus according to Embodiment 1.

Here, there will be explained a LIN-frame format upon reception in the LIN communication performed between the ECU 40 and the vehicle-power-generator control apparatus 200 at a time when the vehicle-power-generator control apparatus 200 receives the LIN frame from the ECU 40. FIG. 4 is an explanatory chart representing a LIN-frame format upon reception in the vehicle-power-generator control apparatus according to Embodiment 1. That is to say, in FIG. 4, the LIN-frame format upon reception includes a break field BF indicating the start of the LIN frame, a synch field SYCF as a synchronization signal, a protected identifier field PIDF as identification information for the LIN frame, reception data pieces 1 through 8 (RDAT1 through RDAT8) that include a maximum of 8 bytes, and a check sum CHK for ascertaining whether or not each of the reception data pieces RDAT1 through RDAT8 has correctly been received.

The reception data 1 RDAT1 in the LIN frame received by the communication unit 21 from the ECU 40 includes 8 bits, i.e., [0], [1], [2], [3], [4], [5], [6], and [7]; the bit [7] among the bits is a boost bit to which a command, from the ECU 40, that issues an instruction of boost-on or boost-off is allocated. For example, in the case of a command for boost-on, the boost bit is set to "1"; in the case of a command for boost-off, the boost bit is set to "0".

The command, from the ECU 40, that issues the instruction of boost-on or boost-off may be allocated to any one of the bits other than the bit "7" of the reception data 1 RDAT1 or to any one of the reception data pieces other than the reception data 1 RDAT1, i.e., any one of RDAT2 through RDAT8.

A command for a time interval during which boost-on or boost-off is continued and a command for magnetic-field-current-on or magnetic-field-current-off are allocated to respective bits among [0], [1], [2], [3], [4], [5], and [6] of the reception data 1 RDAT1 in the received LIN frame. In addition, the command for a time interval during which boost-on or boost-off is continued and a command for magnetic-field-current-on or magnetic-field-current-off may be allocated to any one of the reception data pieces other than the reception data 1 RDAT1, i.e., any one of RDAT2 through RDAT8.

Figure 5:
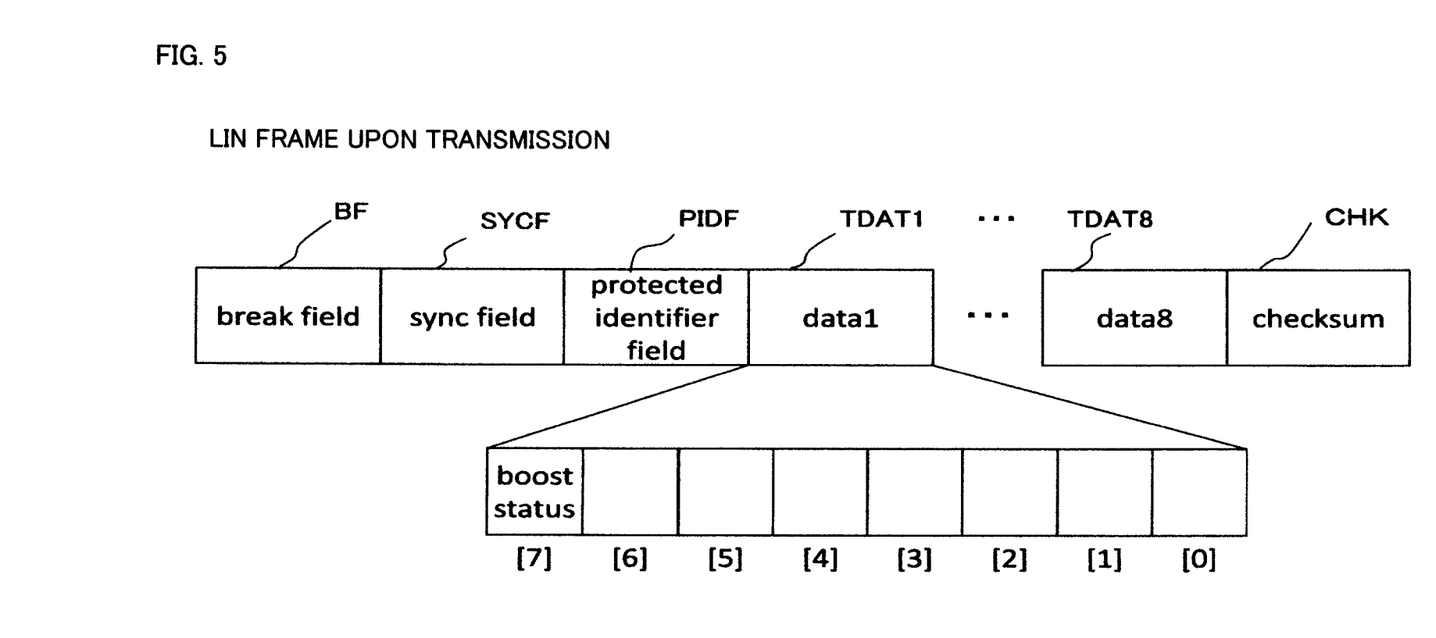
FIG. 5 is an explanatory chart representing a LIN-frame format upon transmission in the vehicle-power-generator control apparatus according to Embodiment 1.

Next, there will be explained a LIN-frame format upon transmission in the LIN communication performed between the ECU 40 and the vehicle-power-generator control apparatus 200 at a time when the vehicle-power-generator control apparatus 200 transmits the LIN frame to the ECU 40. FIG. 5 is an explanatory chart representing the LIN-frame format upon transmission in the vehicle-power-generator control apparatus according to Embodiment 1. That is to say, in FIG. 5, the LIN-frame format upon transmission includes the break field BF indicating the start of the LIN frame, the synch field SYCF as a synchronization signal, the protected identifier field PIDF as identification information for the LIN frame, transmission data pieces 1 through 8 (TDAT1 through TDAT8) that include a maximum of 8 bytes, and the check sum CHK for ascertaining whether or not each of the transmission data pieces TDAT1 through TDAT8 has correctly been received.

The transmission data 1 TDAT1 in the LIN frame to be transmitted from the communication unit 21 to the ECU 40 includes 8 bits, i.e., [0], [1], [2], [3], [4], [5], [6], and [7]; the bit [7] among the bits is allocated as a boost bit for indicating a boost status of boost-on or boost-off. Information of the boost bit indicating the boost status may be allocated to any one of the bits other than the bit "7" of the transmission data 1 TDAT1 or to any one of the transmission data pieces other than the transmission data 1 TDAT1, i.e., any one of TDAT2 through TDAT8.

Information indicating the status of the magnetic-field current, which indicates whether the magnetic-field current is on or off, is allocated to any one of the bits [0], [1], [2], [3], [4], [5], and [6] of the transmission data 1 TDAT1. The information indicating the status of the magnetic-field current may be allocated to any one of the transmission data pieces other than the transmission data 1 TDAT1, i.e., any one of TDAT2 through TDAT8.

Figure 2:
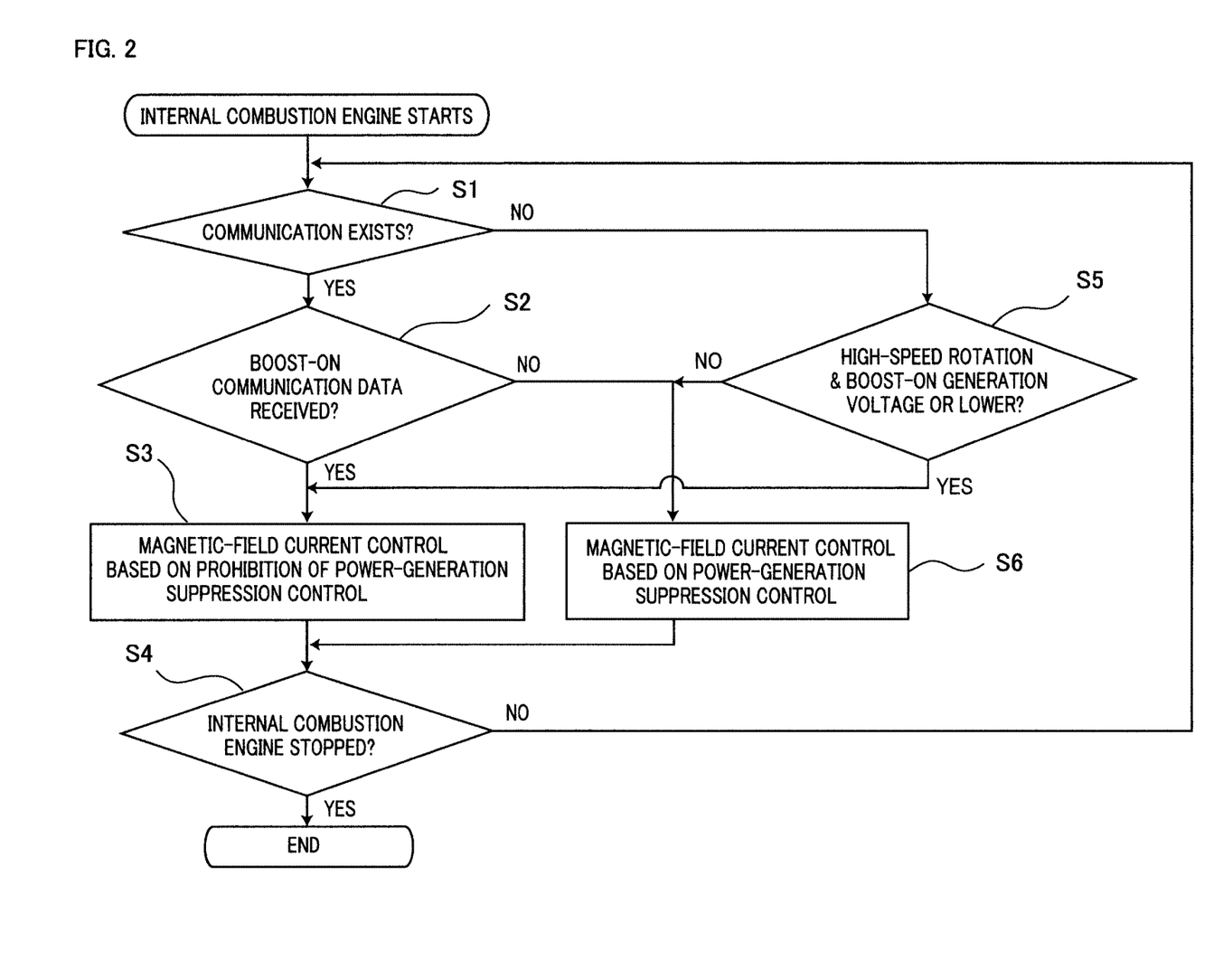
FIG. 2 is a flowchart representing the operation of the vehicle-power-generator control apparatus according to Embodiment 1.
Figure 3:
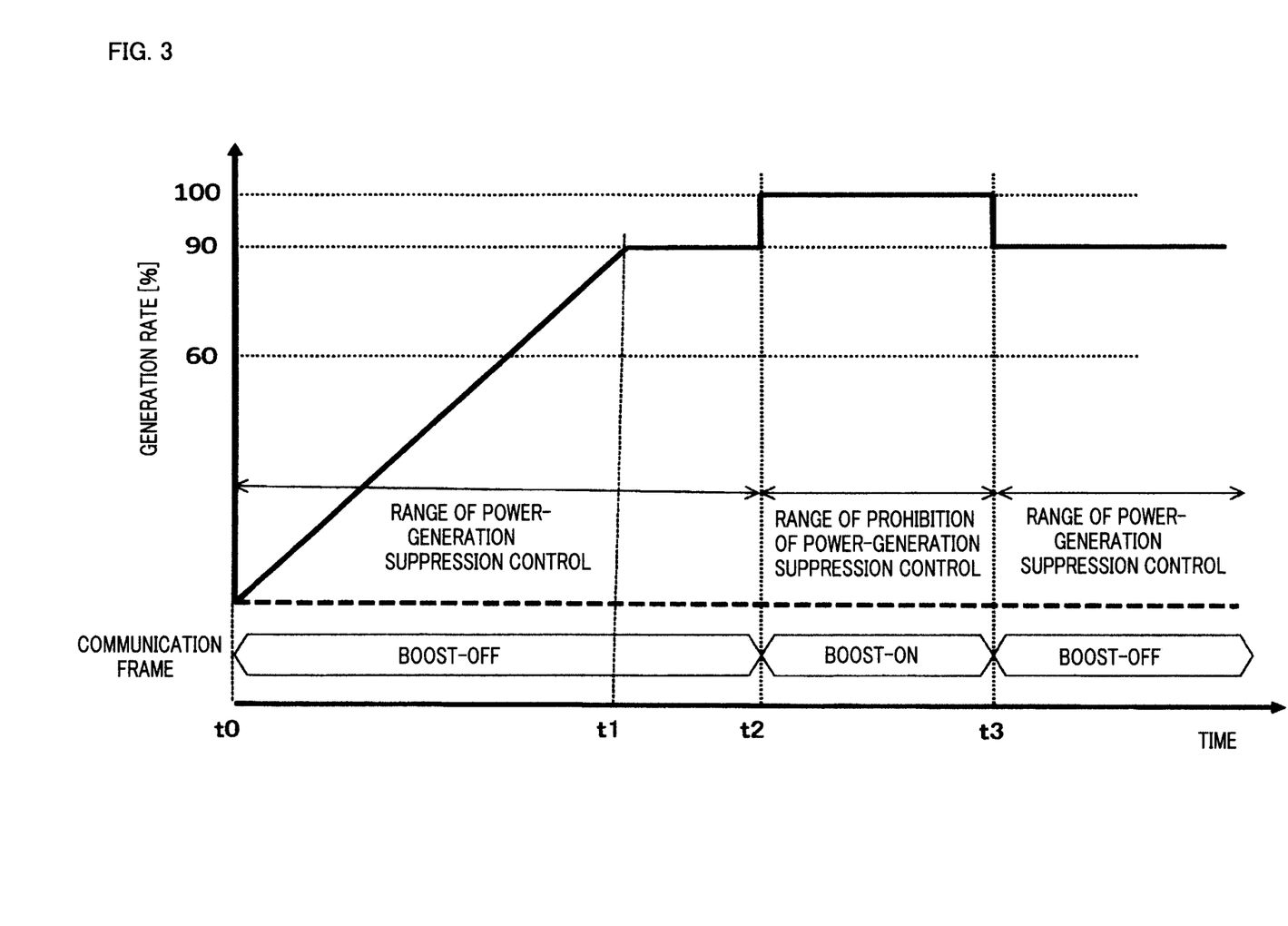
FIG. 3 is a timing chart representing the operation of the vehicle-power-generator control apparatus according to Embodiment 1.

Next, the operation of the vehicle-power-generator control apparatus, configured as described above, according to Embodiment 1 will be explained. FIG. 2 is a flowchart representing the operation of the vehicle-power-generator control apparatus according to Embodiment 1; the operation is repeated in a predetermined time interval. FIG. 3 is a timing chart representing the operation of the vehicle-power-generator control apparatus according to Embodiment 1; the ordinate denotes the generation rate [%] of the vehicle power generator 100, and the abscissa denotes time. In FIG. 3, the internal combustion engine is started at the time t0, and the generation rate reaches 90[%] at the time t1.

The interval from the time t0 to the time t1 is a section from a time when the internal combustion engine starts to a time when the rotation speed thereof reaches a predetermined idle rotation speed. As boost-off, the boost control unit 23 makes the magnetic-field current control unit 22 control the magnetic-field current, based on the magnetic-field current suppression control. In the interval from the time t1 to the time t2, the internal combustion engine continues the idle rotation at the predetermined rotation speed; in this interval, the magnetic-field current suppression control is continued through boost-off, and the generation rate is maintained at 90[%]. The interval from the time t0 to the time t2 is a boost-off section during which power-generation suppression control is performed.

In FIG. 2, after the internal combustion engine starts at the time t0, the communication unit 21 determines in the step S1 whether or not there exists communication between the ECU 40 and the vehicle-power-generator control apparatus 200. The determination in the step S1, i.e., the determination whether or not the communication with the ECU 40 has been established is performed, for example, by monitoring whether or not the ECU 40 is transmitting a LIN-frame command bit; when no change becomes to occur in the LIN-frame command bit, it is determined that a timeout period has elapsed and that the communication with the ECU 40 has not been established.

In the case where it is determined in the step S1 that there exists the communication (YES), the ECU 40 performs power-generation control of the vehicle-power-generator control apparatus 200. Because in this situation, the ECU 40 transmits the LIN frame to which the foregoing boost bit is allocated, the boost control unit 23 detects in the step S2 whether the boost bit in the LIN frame received by the communication unit 21 is "1" as a command for boost-on or "0" as a command for boost-off.

In the case where it is determined in the step S2 that the boost bit is a command for boost-on (YES), the step S2 is followed by the step S3, where at the time t2, the boost control unit 23 receives the command for boost-on and then makes the magnetic-field current control unit 22 perform control based on prohibition of magnetic-field current suppression control. As a result of the operation in the step S3, as represented in FIG. 3, the control based on prohibition of magnetic-field current suppression control is started; thus, the generation rate of the vehicle power generator 100 becomes 100[%]. Next, at the step S4, it is determined whether or not the internal combustion engine has stopped; in the case where the internal combustion engine has not stopped (NO), the step S1 is resumed and the foregoing operation is repeated.

In the case where it is determined in the step S2 that the boost bit is a command for boost-off (NO), the step S2 is followed by the step S6, where the boost control unit 23 makes the magnetic-field current control unit 22 perform the magnetic-field current suppression control, as power-generation suppression control, so that the generation rate becomes 90[%]. The power-generation state in this situation is represented in FIG. 3 (e.g., at the time t3).

In the case where it is determined in the foregoing step S1 that for some reason, the communication with the ECU 40 has been cut off (NO), it is required that the vehicle-power-generator control apparatus 200 itself performs control of the magnetic-field current, based on boost-on or boost-off, because control of the vehicle-power-generator control apparatus 200 cannot be performed by the ECU 40. Accordingly, the step S1 is followed by the step S5, where in accordance with at least one of the rotation speed of the internal combustion engine and the temperature of the vehicle power generator 100 and the power-generation amount of the vehicle power generator 100, it is determined whether boost-on should be performed or boost-off should be performed.

In other words, in the step S5, the boost control unit 23 determines whether or not the rotation speed of the internal combustion engine, inputted from the rotation speed detection unit 24, is a high-speed rotation that is the same as or higher than a predetermined rotation speed at which the torque becomes lower and the generation voltage of the vehicle power generator 100 is the same as or lower than a generation voltage at which boost-on should be performed. In the case where it is determined in the step S5 that the rotation speed of the internal combustion engine is a high-speed rotation that is the same as or higher than the predetermined rotation speed and the generation voltage of the vehicle power generator 100 is the same as or lower than the generation voltage at which boost-on should be performed (YES), the step S5 is followed by the step S3, where control for prohibiting the foregoing power-generation suppression control is performed so that the generation rate becomes 100[%].

In the case where the determination result in the step S5 is (NO), the step S5 is followed by the step S6, where the boost control unit 23 makes the magnetic-field current control unit 22 perform the magnetic-field current suppression control, as power-generation suppression control, so that the generation rate becomes 90[%]. The power-generation state in this situation is represented in FIG. 3 (e.g., at the time t3). Next, at the step S4, it is determined whether or not the internal combustion engine has stopped; in the case where the internal combustion engine has not stopped (NO), the step S1 is resumed and the foregoing operation is repeated. The default value for the boost control is set to boost-off, as the magnetic-field current suppression control for suppressing the power generation.

Figure 6:
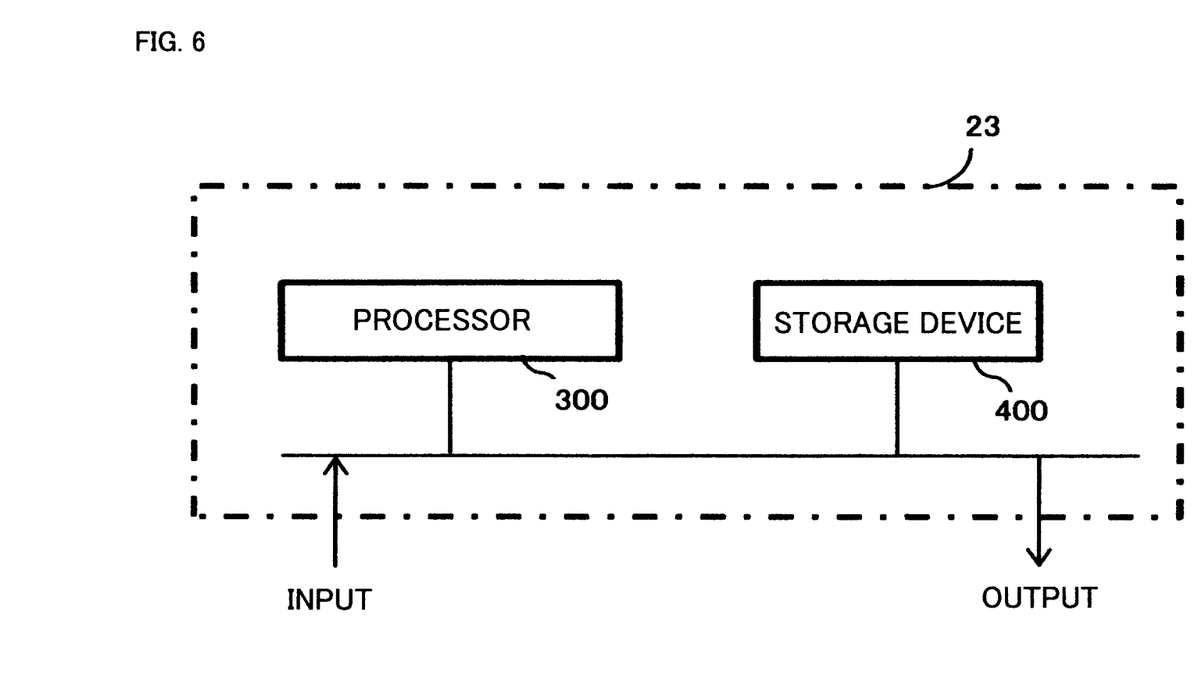
FIG. 6 is a block diagram representing the hardware configuration of a boost control unit in the vehicle-power-generator control apparatus according to Embodiment 1.

As an example represented in FIG. 6, the hardware of the boost control unit 23 in the vehicle-power-generator control apparatus 200 according to Embodiment 1 includes a processor 300 and a storage device 400. Although not illustrated, the storage device 400 has a volatile storage device such as a random access memory and a nonvolatile auxiliary storage device such as a flash memory. Additionally, instead of the flash memory, a hard disk may be included as the auxiliary storage device. The processor 300 implements a program inputted from the storage device 400. In this case, the program is inputted to the processor 300 by way of the volatile storage device. Moreover, the processor 300 may output data such as a calculation result either to the volatile storage device of the storage device 400 or to the auxiliary storage device byway of the volatile storage device.

Comparative Example

Figure 7:
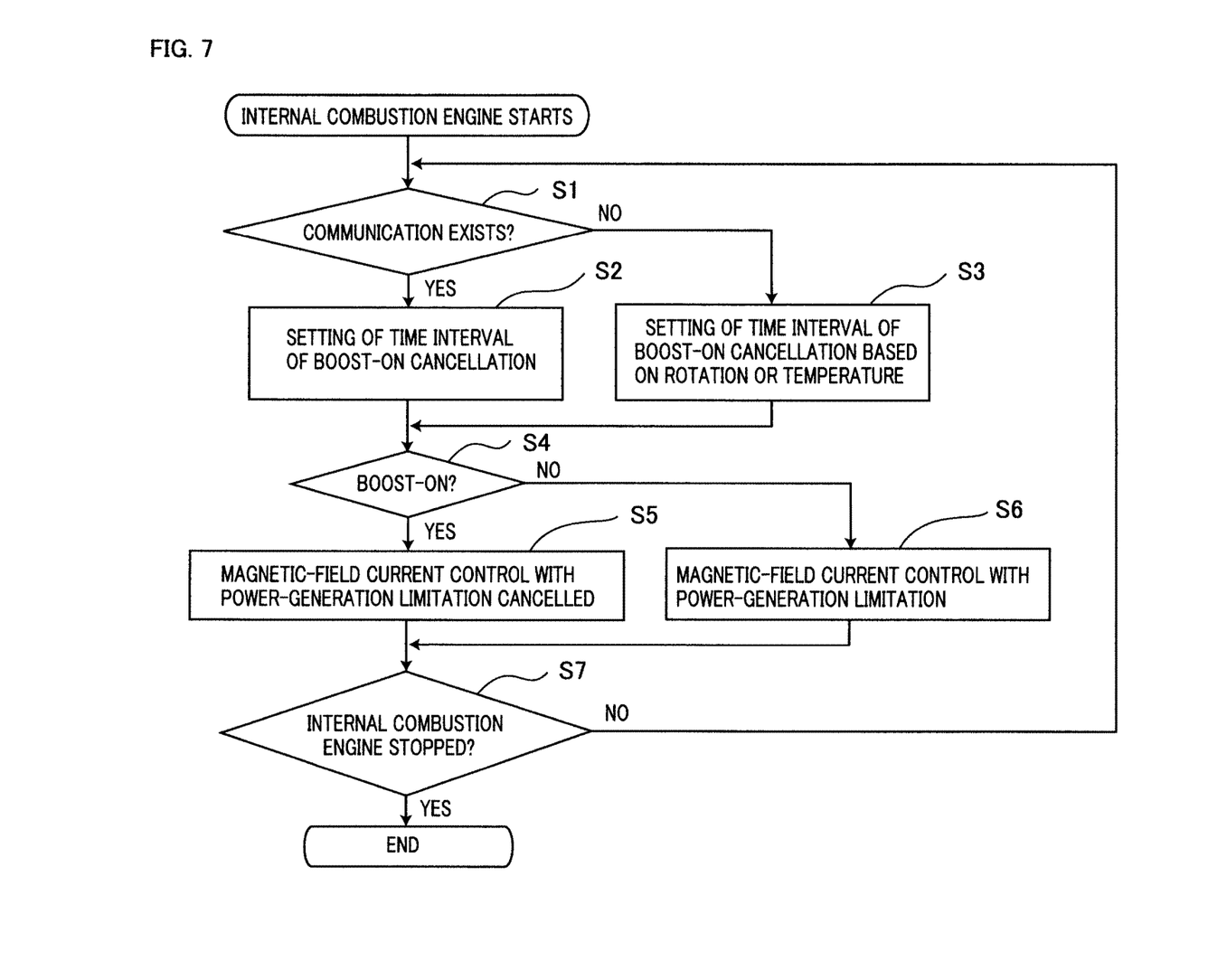
FIG. 7 is a flowchart representing the operation of a vehicle-power-generator control apparatus according to a comparative example.

Next, a comparative example of the vehicle-power-generator control apparatus according to foregoing Embodiment 1 will be explained. FIG. 7 is a flowchart representing the operation of a vehicle-power-generator control apparatus according to a comparative example. In the comparative example, the boost-on control and the boost-off control of a vehicle power generator are performed based on a determination whether or not the output voltage of the vehicle power generator is the same as or higher than a preliminarily set voltage or lower than the preliminarily set voltage, so that the gasoline mileage of a vehicle is raised.

In FIG. 7, in the case where it is determined in the step S1 that the communication with the ECU exists (YES), the step S1 is followed by the step S2, where the ECU sets the time interval for cancellation of boost-on; next, in the step S4, it is determined whether the present magnetic-field current control is for boost-on or boost-off. In the case where it is determined in the step S4 that the present magnetic-field current control is for boost-on (YES), the step S4 is followed by the step S5, where the magnetic-field current control is performed while the power-generation limitation is cancelled, i.e., while the magnetic-field current suppression control is prohibited, in the foregoing set time interval. In the case where it is determined in the step S4 that the present magnetic-field current control is not for boost-on (NO), the step S4 is followed by the step S6, where control of the magnetic-field current is performed while the power-generation is limited, i.e., while the magnetic-field current suppression control is performed.

In the case where it is determined in the step S1 that the communication with the ECU does not exist (NO), the step S1 is followed by the step S3, where the ECU sets the time interval for cancellation of boost-on, based on the rotation speed of the internal combustion engine or the temperature of the vehicle power generator; then, the step S3 is followed by the step S4. In the step S4, it is determined whether or not the present magnetic-field current control is for boost-on; in the case where it is determined that the present magnetic-field current control is for boost-on (YES), the step S4 is followed by the step S5, where the magnetic-field current control is performed while the power-generation limitation is cancelled, i.e., while the magnetic-field current suppression control is prohibited, in the time interval set in the step S3. In the case where it is determined in the step S4 that the present magnetic-field current control is not for boost-on (NO), the step S4 is followed by the step S6, where control of the magnetic-field current is performed while the power-generation is limited, i.e., while the magnetic-field current suppression control is performed.

When the step S7 follows the step S5 or S6, it is determined whether or not the internal combustion engine has stopped; in the case where the internal combustion engine has stopped (YES), the processing is ended; in the case where the internal combustion engine has not stopped (NO), the step S1 is resumed and the foregoing operation is repeated.

The vehicle-power-generator control apparatus according to the comparative example is configured in such a way that the boost-on control and the boost-off control of a vehicle power generator are performed based on a determination whether or not the output voltage of the vehicle power generator is the same as or higher than a preliminarily set voltage or lower than the preliminarily set voltage, but cannot be performed based on a command from the ECU.

In contrast to the comparative example, the vehicle-power-generator control apparatus according to Embodiment 1 makes it possible that boost-on and boost-off are controlled by a command from the ECU 400; therefore, the switching between boost-on and boost-off can instantaneously be performed by a command from the ECU 40. Moreover, because the ECU 40 can detect the respective states of boost-on and boost-off of the vehicle-power-generator control apparatus 200, the boost-on control and the boost-off control of the vehicle power generator 100 can be performed while the ECU 40 monitors the respective states.

Embodiment 1 can appropriately be modified or omitted.

What is claimed is:

1. A vehicle-power-generator control apparatus that can perform boost-off control for making a vehicle power generator generate electric power while a magnetic-field current is suppressed and boost-on control for making the vehicle power generator generate electric power while suppression of a magnetic-field current is prohibited, the vehicle-power-generator control apparatus comprising:
    a communicator that communicates with an external ECU;
    a magnetic-field current controller that controls a magnetic-field current in a magnetic-field coil of a rotor of the vehicle power generator;
    a boost controller that causes the magnetic-field current controller to perform the boost-on control and the boost-off control, wherein the boost-on control adjusts the magnetic-field current to increase a power output of the vehicle power generator to a first output power level, the first power output level corresponds to a predetermined generation rate of the vehicle power generator, and the boost-off control corresponds to a second power output level less than the first power output level;
    a rotation speed detector that detects a rotation speed of an internal combustion engine for driving the vehicle power generator; and
    a temperature sensor that detects a temperature of the vehicle power generator,
    wherein the boost controller is configured to:
        cause the magnetic-field current controller to perform the boost-on control or the boost-off control, based on a command provided by the ECU through communication performed by the communicator, and
        cause the magnetic-field current controller to perform the boost-on control or the boost-off control, based on at least one of a rotation speed of the internal combustion engine, detected by the rotation speed detector, and a temperature of the vehicle power generator, detected by the temperature sensor.

2. The vehicle-power-generator control apparatus according to claim 1,
    wherein when the communication is normal, the boost controller causes the magnetic-field current controller to perform the boost-on control or the boost-off control, based on a command from the ECU, and when the communication is not normal, the boost controller causes the magnetic-field current controller to perform the boost-on control or the boost-off control, based on at least one of the rotation speed detected by the rotation speed detector and the temperature detected by the temperature sensor.

3. The vehicle-power-generator control apparatus according to claim 2,
    wherein the communicator communicates with the ECU through LIN communication, and
    wherein a command to be provided by the ECU is transmitted to the communicator, based on information in a boost bit provided in a LIN-frame format.

4. The vehicle-power-generator control apparatus according to claim 1,
    wherein the communicator communicates with the ECU through LIN communication, and
    wherein a command to be provided by the ECU is transmitted to the communicator, based on information in a boost bit provided in a LIN-frame format.

* * * * *